United States Patent

Shuey

[15] 3,678,493
[45] July 18, 1972

[54] MACHINERY SHAFT RADIAL POSITION MONITOR/ALARM SYSTEM

[72] Inventor: Scott James Shuey, Fullerton, Calif.
[73] Assignee: Borg-Warner Corporation, Chicago, Ill.
[22] Filed: Sept. 21, 1970
[21] Appl. No.: 73,992

[52] U.S. Cl. ........................340/269, 340/267 R, 340/27, 340/28 Z
[51] Int. Cl. .........................................G08b 23/00
[58] Field of Search .................340/269, 267, 271, 282; 308/1 A

[56] References Cited

UNITED STATES PATENTS 3,550,107  12/1970  Thompson et al. ...............340/261
3,411,074  11/1968  Mayer....................................340/271

*Primary Examiner*—John W. Caldwell
*Assistant Examiner*—Michael Slobasky
*Attorney*—Donald W. Banner, William S. McCurry and John W. Butcher

[57] ABSTRACT

A system for monitoring the static and dynamic radial position of a machinery shaft and, if desired, giving an alarm for positions exceeding a pre-set limit. The system was designed for monitoring of large capacity rotating pumps but may find use in other machinery such as turbines, compressors, motors, or the like. Two proximity probes, preferably of the non-contacting type, are positioned adjacent to but spaced from the shaft in a plane perpendicular to its axis along different radii, from the nominal shaft center, which radii are preferably separated by 90° of arc. The output from each probe is converted into two signals (d.c. and a.c.) respectively representative of the radial displacements and the dynamic components of motion of the shaft relative to each probe. These four separate signals are then processed to obtain an orbit radius ($R_o$) signal and an eccentricity (E) signal which may be displayed individually. The $R_o$ and E signals are also summed to produce a total motion ($M_T$) signal which may be displayed and is also employed to operate an alarm when $M_T$ exceeds a pre-set limit. A preselected time delay is preferably incorporated in the alarm to prevent unnecessary actuations during transient conditions such as at start-up.

11 Claims, 3 Drawing Figures

Inventor
Scott J. Shuey
By Richard D. Kinney
Attorney

Inventor
Scott J. Shuey
By Richard L. Kinney
Attorney

3,678,493

MACHINERY SHAFT RADIAL POSITION MONITOR/ALARM SYSTEM

FIELD OF THE INVENTION

The present invention is related to electrical sensing and indicating systems of dynamic and static rotor displacement and is especially directed to a novel machinery shaft radial displacement monitor and/or alarm system for measuring and signaling the dynamic and/or static position of a shaft relative to its bearing.

BACKGROUND OF THE INVENTION

Many types of machinery have shafts which rotate within a bearing without, during expected normal operation, contacting the bearing surface. Indeed, if, during operation, a sufficient eccentric movement occurs to cause bearing contact for a significant period, damage to the shaft and/or the bearing could occur. The present invention was developed to meet this problem in the specific environment of large capacity rotary pumps and is considered to be especially applicable to machinery whose shafts are subject to hydro or aerodynamic unbalance such as compressors and fluid drives. The present invention is, however, considered to be capable of application to other rotating shaft machinery such as turbines, motors, gears, engines, etc.

Unlike systems that have been employed in the past for balancing, the present invention is not concerned directly with unbalance nor with vibration, but is concerned with shaft transverse position measurement and monitoring. While prior mechanisms have been developed for use in turbines and the like that monitor longitudinal heat expansion, the present invention is directed to a novel transverse position monitoring system.

SUMMARY OF THE INVENTION

A system for monitoring a shaft transverse displacements constructed in accordance with the present invention includes two probes, preferably of the proximity type, positioned in proximity to the shaft, at different radial positions relative to its axis, means coupled to the probes are provided for producing electric signals representative of shaft displacement and means coupled to the signal producing means are provided for utilizing the signal to produce an output in response to said displacement signals indicating shaft displacement conditions exceeding a preselected value.

The invention, together with the further advantages thereof, may best be understood by reference to the following description taken in connection with the accompanying drawings, in the several figures of which like reference numerals identify like elements.

DETAILED DESCRIPTION

Figure 1:
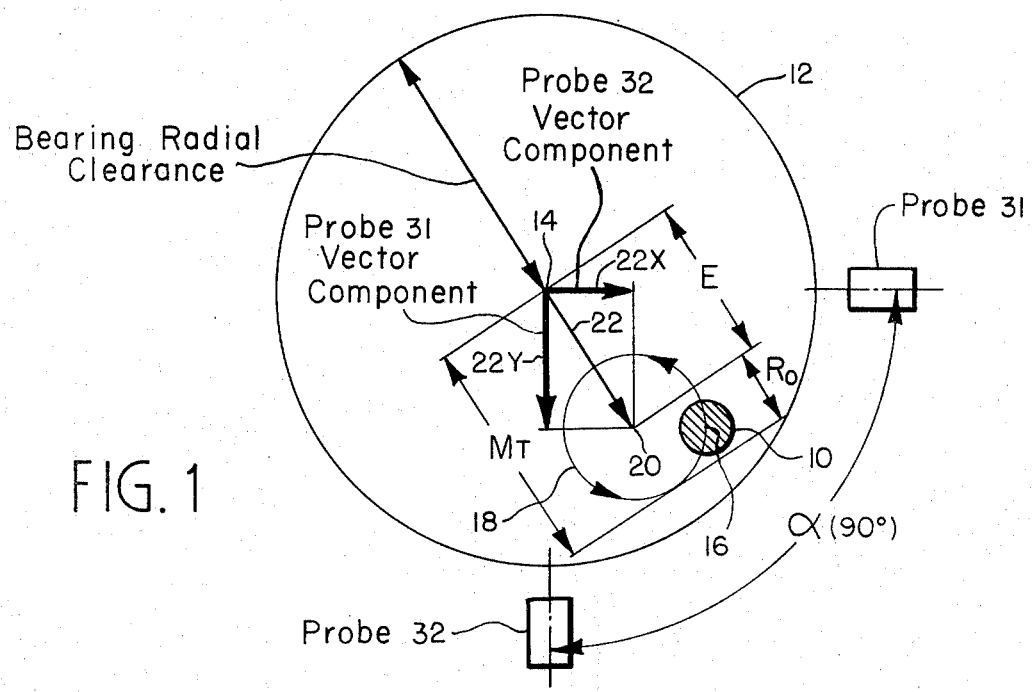
FIG. 1 is a diagram representing the transverse motion and displacement of a shaft in its bearing and illustrating a preferred placement of the probes for the present invention.

Referring to FIG. 1, there is depicted, in diagrammatic form and greatly out of scale, the relationships between a shaft indicated by the numeral 10 and its support bearings indicated by the numeral 12. This diagram is useful for defining the terms and relationship we need to describe the present invention. The bearings 12 have a center line represented by the point designated 14 and the shaft 10 has a center line represented by the point designated 16. The distance from the bearing center to the bearing 12 is the bearing radial clearance.

In general, the shafts center line 16 and the bearings center line 14 will not coincide, but especially under dynamic conditions the shaft center will move, often in a circular or approximately circular path, as indicated by the circle 18 while, of course, spinning about its own center 16. The path or orbit of the shaft center 16, in turn, has a center, designated 20, about which the shaft is orbiting.

We will define, for our purposes, a distance "E" which is the distance from the bearing center line represented by point 14 to the orbit pattern center point 20. E is thus the length of a vector 22 from points 14 to 20 which we will term the "Eccentricity" of the shaft 10 relative to its bearings 12. That is, the eccentricity is the apparent static position of the shaft center line 16 relative to the bearing center line 14.

We also define the term $R_o$ or "orbital radius," using FIG. 1, as that distance from the orbital pattern center point 20 to the orbit path 18. The arithmetic sum of the eccentricity E and the orbital radius $R_o$ is defined as the "Total Motion" $M_T$. That is:

$$M_T = E + R_o$$

In accordance with the present invention two probes 31 and 32 are provided outside of the bearing surface 12 at different radii from the bearing center line 14, but preferably positioned in the same transverse (to the shaft) plane at radii separated by 90° of arc. Each probe 31, 32 essentially measures the distance between it and the shaft 10 along the radius from the point 14 at which it is positioned. Thus their respective outputs are proportional to the vector components of motion along their respective radii from the point 14.

As the parameter E is quite steady for a given pump operating condition, the steady state or direct current (d.c.) output of the probes 31 and 32 are proportional to the radial vector components of E as represented by the vectors 22x and 22y, in FIG. 1, for respectively the component measured by probe 31 and that measured by probe 32.

The orbit is, however, reflected in the dynamic (a.c.) probe output signals since the shaft 10 is not remaining in one position but is moving about. To measure the total motion, $M_T$, both the orbital signal and the eccentricity must be employed.

Figure 2B:
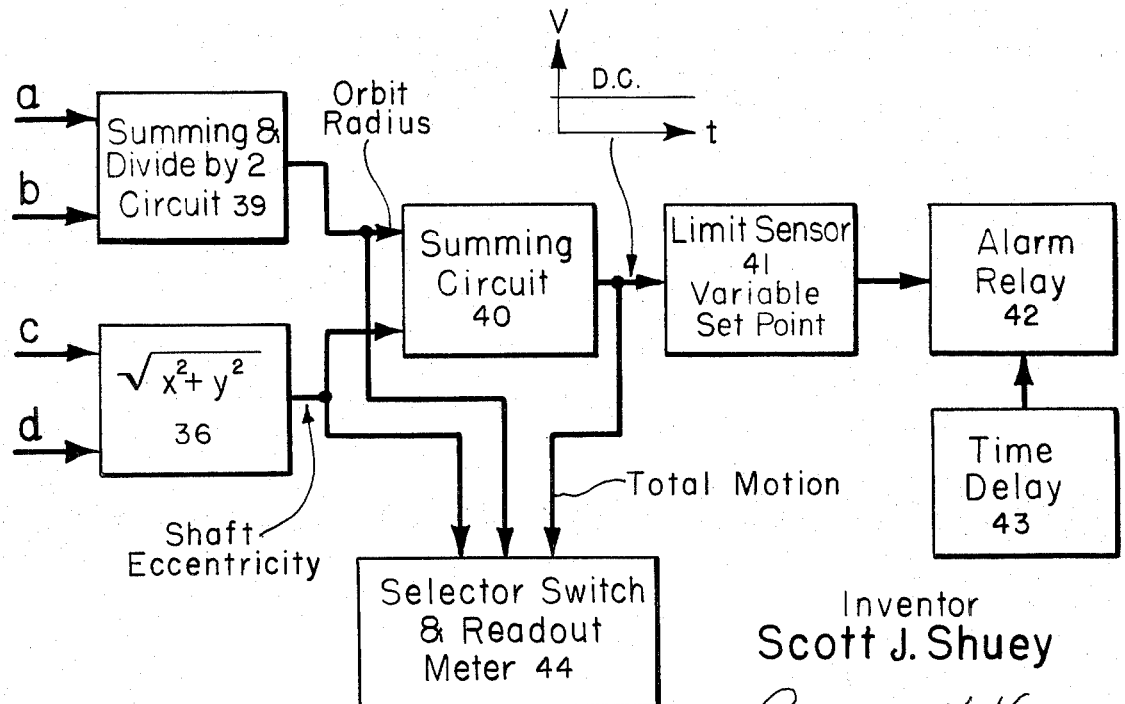
FIG. 2 is a block diagram (in two Sections, FIGS. 2a and 2b, FIG. 2a being continued in FIG. 2b) of a system embodying the present invention.
Figure 2A:
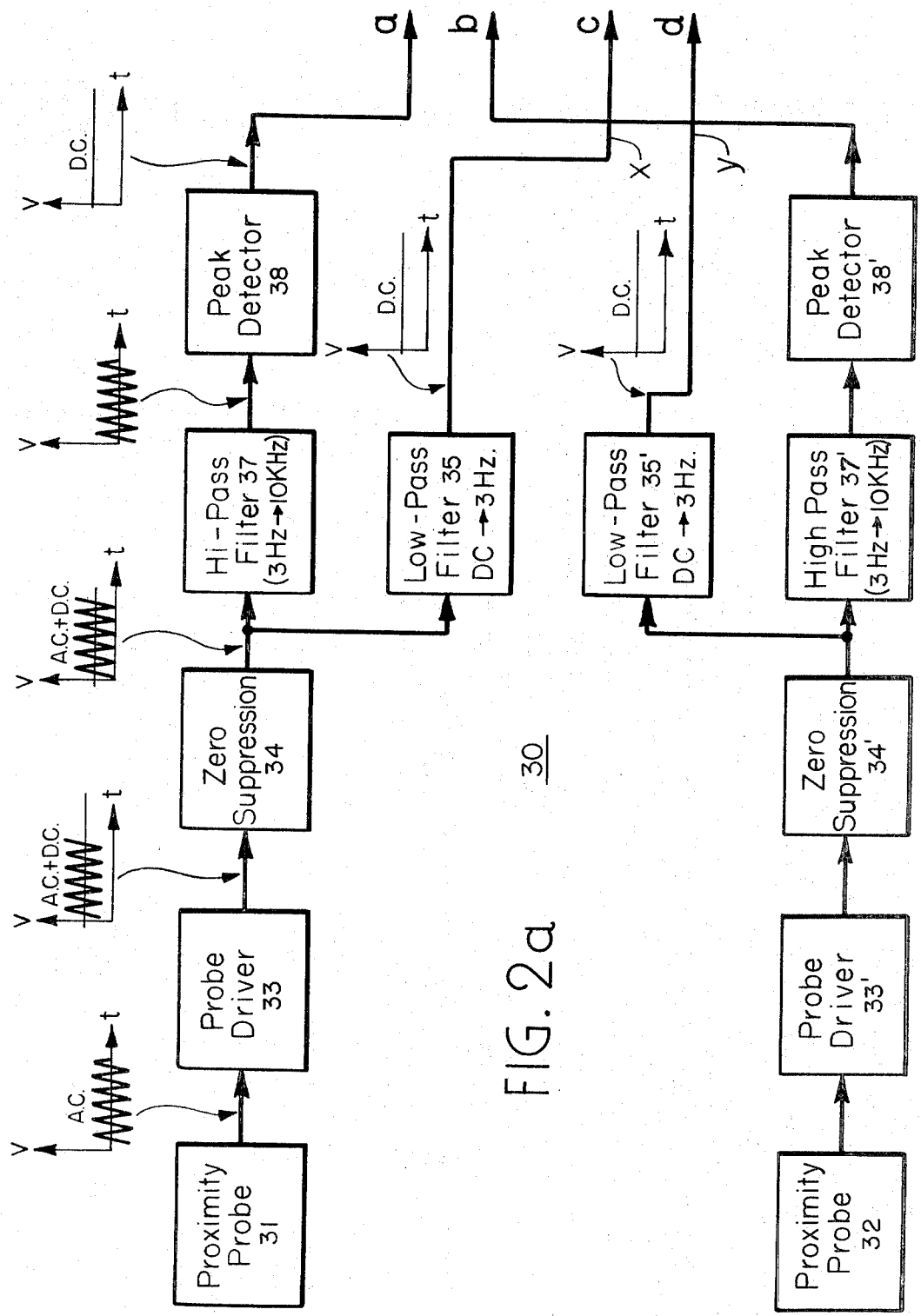

Referring to FIG. 2, a system constructed in accordance with the present invention, and generally designated by the numeral 30 is there depicted. The system 30 includes the probes 31 and 32 and operates as follows:

I. Each of the proximity probe 31 and 32 senses the shaft surface and produces a high frequency a.c. electrical signal proportional to the shaft position and motions.

II. A pair of probe drivers 33, 33' coupled to receive the signal from respectively, the probes 31 and 32, convert that probe's a.c. signal into an equivalent d.c. electrical signal, (representing shaft position) combined with an a.c. signal, representing shaft dynamic motion.

III. A pair of zero suppression circuits 34 and 34' modify respectively the output signals of the probe drivers 33 and 33' so that the signal level is zero when the shaft 10 is exactly in the center of the bearing. In this way, any signal other than zero indicates the shaft has moved from the center position.

IV. A pair of low pass filters 35 and 35' allow only the d.c. signal component of the respective outputs from the suppression circuits 34, 34' to pass through; these signals represent the two d.c. components of the eccentricity (E) parameter. Since the two probes 31, 32 are located so as to measure shaft position in one transverse plane, and are located 90° apart from each other the signal from each probe represents the length of vectors 22x, 22y. The value of the parameter E is the length of the vector 22 which is the vector sum of these two vectors 22x and 22y or using vector algebra, E is equal in value to the square root of the sum of the values of the above two vectors squared; ie $$E = [\text{vector } 22x^2 + \text{vector } 22y^2]^{1/2}.$$

V. A vector circuit 36 performs the square root of the summed squared vectors operation described above. The d.c. output signal represents the E, or eccentricity, parameter.

VI. A pair of high pass filters 37 and 37' respectively allow passage of only the a.c. signals of the suppressors 34 and 34' which represent the dynamic shaft motion. These signals are basically sinusoidal in shape.

VII. A pair of peak detectors 38, 38' produce d.c. signals whose respective levels are proportional to the peak value of the above sine waves resulting respectively from the filters 37, 37'. The peak to peak amplitude of these sine waves represents the maximum and minumum shaft movement, or is equivalent to the orbit diameter. Therefore the peak detector output signal, being one half of peak to peak, represents the orbit radius.

VIII. A summing and divide by 2 circuit 39 adds together the two d.c. signals representing the orbit radius and then divides the sum by 2 to produce a d.c. signal exactly proportional to the average orbit radius. Since the dynamic shaft motions in the planes of probes 31 and 32 are very similar in amplitude, this step combines the two into one signal for simplicity.

IX. A summing circuit 40 adds together the parameters eccentricity (E) and orbit radius ($R_o$) to produce the final answer, a signal proportional to total motion ($M_T$).

X. A limit sensor/variable set point 41 compares the monitored voltage representing $M_T$ against a set point voltage representing the value of $M_T$ allowed before alarming. If $M_T$ is less than set point, no output signal is produced. However, if $M_T$ exceeds the set point, an output signal is produced which initiates the alarm relay.

XI. An alarm relay 42, which may be a standard alarm control device as currently used in vibration monitor systems, functions to produce an alarm signal at a suitable time.

XII. A time delay unit 43 provides a time delay period after being initiated, which prevents the alarm from operating when the limit set point is temporarily exceeded, such as during the transient period of pump startup. The time delay is triggered by an outside signal associated with the pump starting equipment. This also is a standard vibration instrument function.

XIII. A selector switch and readout meter 44 is optional and provides a means of reading the value of (shaft eccentricity, orbit, and total motion) parameters during operation of the system. It is preferably used, at least, during probe installation and calibration.

The probes 31, 32 were described above as eddy current type probes, however, other probes may be employed without departing, in at least the broader aspects, from the present invention. Specifically capacitive, optical, reluctance, or pneumatic probes may also be employed. In addition, although not the preferred manner of practicing the invention, contacting probes such as strain gages could be utilized.

As should now be apparent a new and improved monitoring system has been described that provides for protection of a rotating shaft machinery in a positive and effective manner.

While a particular embodiment of the invention have been shown and described, it will be obvious to those skilled in the art that changes and modifications may be made without departing from the invention in its broader aspects and, therefore, the aim in the appended claims is to cover all such changes and modifications as fall within the true scope of the invention as determined by the prior art.

What is claimed is:

1. A machinery shaft position monitor system for monitoring the radial displacement position of a machinery shaft within its bearings, which shaft is subject to being rotated, comprising:

two probes for sensing the position of the shaft, each of which is positioned adjacent to the shaft at different radii from the shaft bearing center line, and each developing output signals generally representative of the radial vector component of the shaft's displacement from the bearing center line;

means coupled to said probes for processing the output signals from said probes and for developing therefrom at least one signal indicative of the position of the shaft relative to the bearing center line;

said signal processing means including means for separating the signals from each of said probes into a signal indicative of a vector component of one of the shaft's movement components, and means for adding the vector component signals so derived to yield, at least one signal representative of the one motion component; and means for utilizing that at least one signal.

2. The machinery shaft position monitor system as defined in claim 1, wherein:

said two probes are positioned in a plane that is approximately transverse to the shaft axis;

said two probes are each of the proximity type that produce electrical output signals and are positioned adjacent to but spaced from the shaft;

means for developing from at least one of said probes a signal indicative of the radial orbit ($R_o$), and said signal processing means develops signals representative of the magnitude of the eccentricity (E) of said shaft as said one signal, and includes means for adding said eccentricity magnitude signal (E) with the signal representative of the radial orbit ($R_o$) to produce a signal representative of the total motion ($M_T$).

3. The machinery shaft position monitor system as defined in claim 2, wherein:

said signal utilizing means comprising means for receiving the total motion ($M_T$) signal from said eccentricity (E) and radial orbit ($R_o$) signal adding means and to compare that total motion ($M_T$) signal to a predetermined value and to produce an output signal when that total motion signal exceeds the predetermined value.

4. The machinery shaft position monitor system as defined in claim 3, wherein:

said signal processing means includes:

a first and a second probe driver (31, 31') each coupled to a different one of said two probes for producing from the output of said probes a signal having a d.c. component representative of the respective vector component magnitudes of E and a superimposed a.c. signal representative of $R_o$.

5. The machinery shaft position monitor system as defined in claim 4, wherein:

said two probes are of the eddy current type and are separated by 90° of arc relative to the bearing center;

said signal processing means includes:

a first and a second low pass filter (35, 35') each coupled to receive the output signals of one of said first and second drivers and to transmit essentially only the d.c. component thereof;

a vector circuit (36) coupled to receive the transmitted signals from said first and said second low pass filters and to yield an eccentricity magnitude signal.

6. The machinery shaft position monitor system as defined in claim 5, wherein said signal processing means includes:

at least one high pass filter (37) coupled to one of said first and second probe drivers for passing essentially only the a.c. component of said driver's output; and a peak detector (38) coupled to receive the output from said high pass filter and to produce therefrom a signal representative of orbital radius ($R_o$).

7. The machinery shaft position monitor system as defined in claim 6, wherein said utilization means includes:

at least one meter on which at least one of said signals representing E, $R_o$ or $M_T$ may be displaced.

8. The machinery shaft position monitor system as defined in claim 7 wherein:

said means for deriving signal is a summing circuit (40);

said utilization means includes an alarm generating unit (42) coupled to said signal adding means;

a time delay unit (43) is coupled to said alarm generating unit (42) for delaying the generation of an alarm for a preselected period after said $M_T$ signal exceeds said preselected value and for allowing the generation of the alarm at the end of that period if and only said, $M_T$ signal still exceeds said preselected value, so that alarms are not generated for transient conditions.

9. The invention of claim 1 wherein a signal indicative of the radius orbit of the shaft is produced by said probe signal processing means.

10. The invention of claim 1 wherein a signal indicative of the essentricity is produced by said probe signal processing means.

11. The invention of claim 1 wherein a signal indicative of the total motion is produced by said probe signal processing means.

* * * * *